US009858453B2

(12) United States Patent
Moon et al.

(10) Patent No.: US 9,858,453 B2
(45) Date of Patent: Jan. 2, 2018

(54) INFORMATION UPDATING METHOD OF ELECTRONIC LABEL, AND SYSTEM THEREOF

(71) Applicant: SOLUM CO., LTD., Suwon-si (KR)

(72) Inventors: Ung Han Moon, Suwon-si (KR); Gi Young Byun, Suwon-si (KR); Sung Ki Kim, Suwon-si (KR); Jong Gi Ryu, Yongin-si (KR)

(73) Assignee: SOLUM CO., LTD., Suwon-si (KR)

( * ) Notice: Subject to any disclaimer, the term of this patent is extended or adjusted under 35 U.S.C. 154(b) by 0 days.

(21) Appl. No.: 14/750,223

(22) Filed: Jun. 25, 2015

(65) Prior Publication Data

US 2016/0004891 A1 Jan. 7, 2016

(30) Foreign Application Priority Data

Jul. 1, 2014 (KR) ........................ 10-2014-0082087

(51) Int. Cl.
*G06K 7/10* (2006.01)
*G06Q 30/06* (2012.01)
*G09F 3/20* (2006.01)

(52) U.S. Cl.
CPC ......... *G06K 7/10198* (2013.01); *G06Q 30/06* (2013.01); *G09F 3/208* (2013.01)

(58) Field of Classification Search
CPC .................... G06K 7/10198; G09F 3/208
See application file for complete search history.

(56) References Cited

U.S. PATENT DOCUMENTS

2011/0084951 A1  4/2011  Karhuketo et al.
2011/0240731 A1* 10/2011  Lee ........................ G06Q 30/06
                                                                235/375
(Continued)

FOREIGN PATENT DOCUMENTS

EP  2728539 A1  5/2014
GB  2503961 A   1/2014
(Continued)

OTHER PUBLICATIONS

Extended European Search Report dated Oct. 21, 2015 in counterpart European Application No. 15174474.5 (7 pages, in English).
European Search Report dated Sep. 23, 2016 in counterpart European Application No. 15 174 474.5 (7 pages).
(Continued)

*Primary Examiner* — Curtis Odom (57) ABSTRACT

An information updating method of an electronic label that is capable of updating information on products displayed on store shelves, and a system thereof. According to an exemplary embodiment, an electronic label system includes: an electronic label configured to comprise a display, an Near Field Communication (NFC) tag, a memory, and a processor that interfaces with the NFC tag; and a terminal device configured to acquire identification information of the electronic label through the NFC tag, to check, based on the acquired identification information of the electronic label, whether there is product information required to be updated regarding the electronic label, and, in response to a check result showing that there is product information required to be updated, to transmit the product information required to be updated to the electronic label through the NFC tag.

6 Claims, 7 Drawing Sheets

(56) References Cited

U.S. PATENT DOCUMENTS

| 2012/0055985 | A1  | 3/2012 | Allen |
| 2014/0177604 | A1* | 6/2014 | Lee ................... H04W 52/0212 370/336 |
| 2014/0214620 | A1  | 7/2014 | Hulth et al. |
| 2015/0035674 | A1* | 2/2015 | Karhuketo ........... G06K 19/027 340/572.8 |

FOREIGN PATENT DOCUMENTS

| KR | 10-2006-0097809 A | 9/2006 |
| KR | 10-2010-0036655 A | 4/2010 |
| KR | 10-2011-0109072 A | 10/2011 |
| KR | 10-2012-0028177 A | 3/2012 |
| KR | 10-2012-0082499 A | 7/2012 |
| KR | 10-2013-0060756 A | 6/2013 |
| KR | 10-1321397 B1 | 10/2013 |
| KR | 10-2014-0056797 A | 5/2014 |
| WO | WO 2010/082835 A1 | 7/2010 |
| WO | WO 2012/154091 A1 | 11/2012 |

OTHER PUBLICATIONS

Korean Office Action dated Mar. 24, 2016 in counterpart Korean Patent Application No. 10-2014-0082087 (13 pages, with English translation).

Korean Office Action dated Jun. 9, 2016 in counterpart Korean Patent Application No. 10-2014-0082087 (13 pages, with English translation).

Summons to attend oral proceedings pursuant to Rule 115(1) EPC dated Jun. 12, 2017 in counterpart European application No. 15 174 474.5 (7pages).

\* cited by examiner

INFORMATION UPDATING METHOD OF ELECTRONIC LABEL, AND SYSTEM THEREOF

CROSS-REFERENCE TO RELATED APPLICATION(S)

This application claims priority from Korean Patent Application No. 10-2014-0082087, filed on Jul. 1, 2014, in the Korean Intellectual Property Office, the entire disclosure of which is incorporated herein by reference for all purposes.

BACKGROUND

1. Field

The following description relates to an information updating method of an electronic label that displays information on products displayed on store shelves, and a system thereof.

2. Description of the Related Art

Electric Information Label (EIL, hereinafter referred to as 'electronic label') is an electronic device that replaces a paper label that displays information (for example, name, price, and origin) of products on store shelves. Through communication with a management server, an electronic label receives product information, for example, a product's name and price, from the management server and displays the received product information.

It is crucial to reduce power consumption of a battery-powered electronic label, so that a user may become less bothered to replace battery at short intervals.

An electronic label needs to be activated for installation. It is possible to wake up an installed electronic label using a terminal device to transmit initial product information. The terminal device uses a WiFi network to register the electronic label in the management server.

After being registered in the management server, the electronic label remain in a sleep mode except for a wake-up period necessary to update information. In addition, an electronic label employs an Electronic Paper Display (EPD) that keeps information to be displayed without power supply. During the wake-up period, the electronic label listens to communication to a management server, and, if there is data necessary to be received from the management server, the electronic label receives and stores the data.

Such an electronic label system establishes a WiFi network and a Zigbee network separately, and installs different relays to access each of the two networks.

SUMMARY

The following description relates to an information updating method of an electronic label and a system using the method in which information on products displayed on store shelves may be updated over a single communication network.

In addition, the following description relates to an electronic label system that requires less costs to establish so that the electronic label system may be applied even to a small store.

In one general aspect, there is provided an electronic label system including: an electronic label configured to comprise a display, an Near Field Communication (NFC) tag, a memory, and a processor that interfaces with the NFC tag; and a terminal device configured to acquire identification information of the electronic label through the NFC tag, to check, based on the acquired identification information of the electronic label, whether there is product information required to be updated regarding the electronic label, and, in response to a check result showing that there is product information required to be updated, to transmit the product information required to be updated to the electronic label through the NFC tag.

The NFC tag may be configured to, in response to receiving the product information required to be updated, wakes up the processor from a sleep mode, and to transmit the product information required to be updated.

The electronic label system may further include a management server configured to receive the acquired identification information from the terminal device, and to transmit, to the terminal device, product information required to be updated, which corresponds to the acquired identification information of the electronic label.

The terminal device may communicate with the management server through WiFi communication.

In another general aspect, there is provided an information updating method of an electronic label, including: acquiring, by a terminal device, identification information of the electronic label through a Near Field Communication (NFC) tag; checking, by the terminal device, based on the acquired identification information of the electronic label, whether there is product information required to be updated regarding the electronic label; in response to a check result showing that there is product information required to be updated regarding the electronic label, transmitting, by the terminal device, the product information required to be updated to the electronic label through the NFC tag; and updating, by the electronic device, displayed product information.

The checking of whether there is product information required to be updated regarding the electronic label may include: receiving, by the management server, from the terminal device, an updated information request message that includes the acquired identification information of the electronic label; and transmitting, by the management server, to the terminal device, product information required to be updated, which corresponds to the received updated information request message, in order to check whether there is product information required to be updated.

The checking of whether there is product information to be updated regarding the electronic label may include: receiving, by the terminal device, from the management server, update target information, which includes the acquired identification information of the electronic label, and product information to be updated, which corresponds to the acquired identification information of the electronic label; and checking, by the management server, based on the update target information and the acquired identification information of the electronic label, whether there is product information required to be updated regarding the electronic label.

The updating of displayed product information may include, in response to receiving through the NFC tag the product information to be updated through, waking up a processor from a sleep mode, storing the product information to be updated, and displaying the stored product information.

Other features and aspects may be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Figure 1:
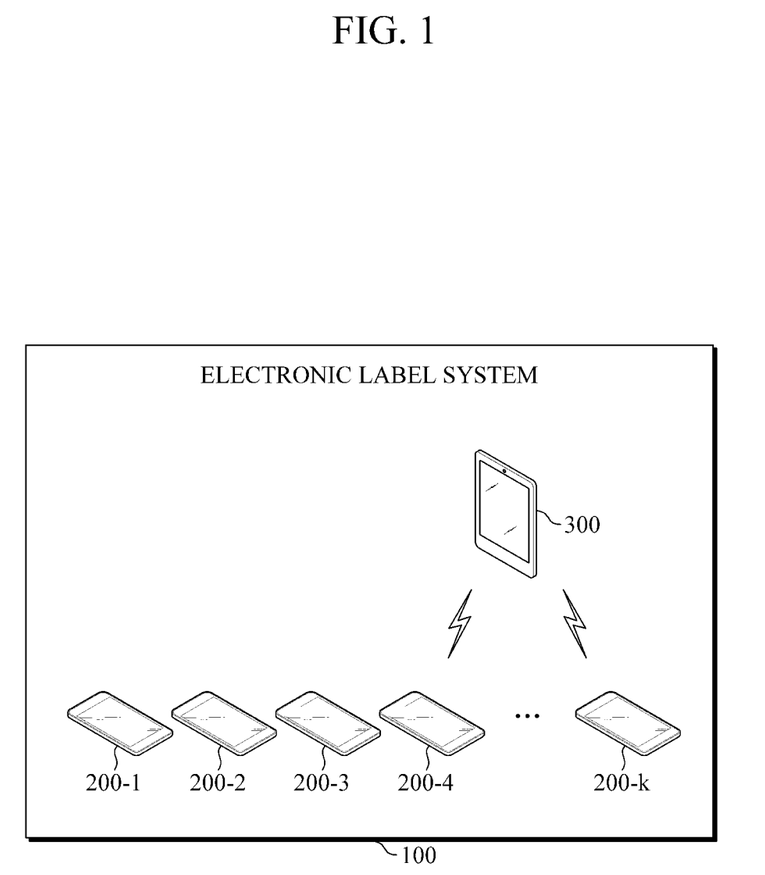
FIG. 1 is a diagram illustrating a configuration of an electronic label system according to an exemplary embodiment.

FIG. 1 is a diagram illustrating a configuration of an electronic label system according to an exemplary embodiment.

Referring to FIG. 1, an electronic label system 100 includes an electronic label 200 and a terminal device 300. The electronic label 200 includes a display, a Near Field Communication (NFC) tag, a memory, and a processor that interfaces with the NFC tag and controls the electronic label 200. The terminal device 300 acquires identification information of the electronic label 200 through the NFC tag. Based on the acquired identification information, the terminal device 300 checks whether there is product information to be updated regarding the electronic label 200, and, if so, transmits the product information to be updated to the electronic label 200 through the NFC tag.

The terminal device 300 is able to transmit and receive information with respect to the electronic label 200 through local area wireless communication. The local area wireless communication may be Near Field Communication (NFC).

Figure 2:
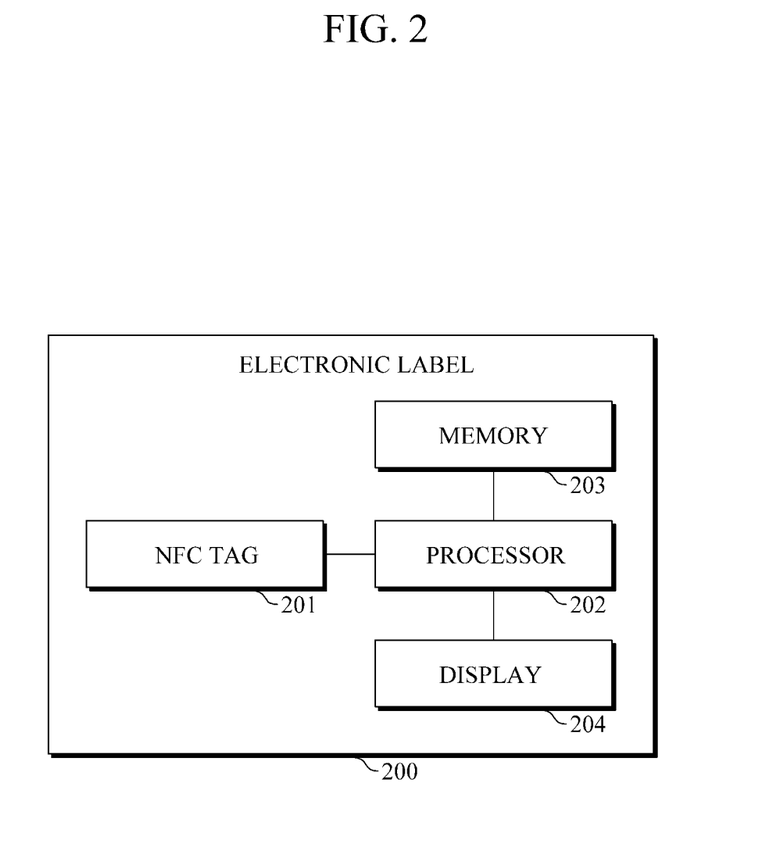
FIG. 2 is a block diagram illustrating an electronic label according to an exemplary embodiment.

FIG. 2 is a block diagram illustrating an electronic label according to an exemplary embodiment.

Referring to FIG. 2, the electronic label 200 includes an NFC tag 201, a processor 202, a memory 203, and a display 204. The configuration of the electronic label 200 shown in FIG. 2 is merely exemplary, and the electronic label 200 may include only some of the modules shown in FIG. 2 and/or further include other modules essential for operations as the same as those performed by the modules shown in FIG. 2. For example, the electronic label 200 may further include a manipulator configured to allow a user to directly input product information or a command.

The electronic label 200 is installed on a shelf in a manner of allowing a potential customer to notice easily, and may display information on a product displayed on the shelf.

The term "product information" used throughout the following descriptions indicates information for identifying or distinguishing a product, product name, product price, product origin, or information on the whole process including production, distribution, storage, and consumption of the product. In another example, the term "product information" may mean a product's manual information, quantity information, and advertising information. If the product is food, the product information may include recipe information and ingredient information.

The NFC tag 201 has unique identification information, for example, an Electronic Product Code (EPC), and may be active or passive. In an exemplary embodiment, a passive NFC tag 201 may be applied. Throughout the following descriptions, the NFC tag 201 conceptually includes a Radio Frequency Identification (RFID) tag. RFID tag information may include at least one of an EPC, a U-code, a code that follows the ISO/IEC 15963 standard, or an arbitrary code.

Meanwhile, the NFC tag 201 is usually composed of an Integrated Circuit (IC) chip and an antenna circuit. The IC chip may include a processor and a memory device according to intention of an ordinary one skilled in the art, a field in which the NFC tag 201 is applied, whether the NFC tag 201 is active or passive, or a frequency band (or a frequency modulation method). If a passive NFC tag in an inactive state receives a wireless signal, the passive NFC tag is activated due to power supply from power components included in the wireless signal. In this manner, an electronic label may be activated by the terminal device 300 without operating power.

Once product information to be updated is received in the NFC tag 201, the processor 202 is waken up from a sleep mode to store, in the memory 203, the product information to be updated and transmit the product information to be updated to the display 204. By applying the wake-up technique, it is possible to reduce power consumption that is required for communication between the electronic label 200 and the terminal device 300.

The memory 203 is configured to store product information. If the processor 202 is waken up once product information to be updated is received from the terminal device 300, the memory 203 may update the product information and store the updated product information.

The display 204 is configured to display product information. If product information to be updated is received from the terminal device 300, product information displayed on the display 204 may be updated. The display 204 may be an EPD that is able to display information without power supply, but aspects of the present disclosure are not limited thereto. For example, the display 204 may be a device that include Liquid Crystal Display (LCD), Plasma Display Panel (PDP), Light Emitting Diode (LED), Cathode-Ray Tube (CRT), and the like.

There are well-known EPDs including: a twist ball-type display of Xerox, which uses a semi-spherical type twist ball with charged electrostatic charges; an electrophoretic display of E-ink, which utilizes electrophoresis and a microcapsule; and a cholesteric liquid crystal display of Kent Display. For example, the EPDs in FIG. 3 may be a product that includes: a thin film transistor (TFT) substrate having a TFT formed on a poly silicon layer deposited on a plastic substrate; a transparent electrode substrate; and a microcapsule layer sealed between the TFT substrate and the transparent electrode substrate, wherein CMOS circuits are formed by recrystallizing edges of a TFT substrate.

The terminal device 300 acquires identification information of the electronic label 200 through the NFC tag 201;

checks, based on the acquired identification information, whether there is product information to be updated regarding the electronic label 200; and, if so, transmits product information to be updated to the electronic label 200 through the NFC tag 201. A configuration of the terminal device 300 is described in detail with reference to FIG. 3.

Figure 3:
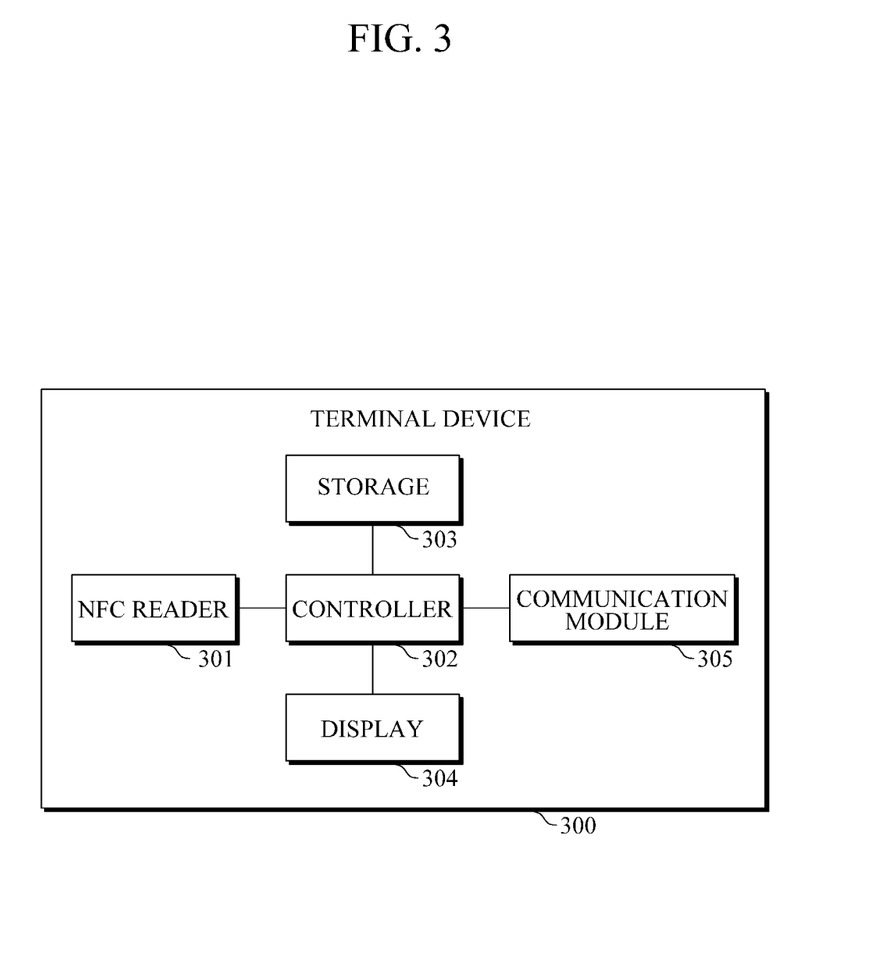
FIG. 3 is a block diagram illustrating a terminal device according to an exemplary embodiment.

FIG. 3 is a block diagram illustrating a terminal device according to an exemplary embodiment.

Referring to FIG. 3, the terminal device 300 acquires identification information of the electronic label 200 through the NFC reader 301; based on the acquired identification information, checks whether there is product information to be updated regarding the electronic label 200; and, if so, transmits the product information to be updated to the electronic label 200 through the NFC reader 301. Accordingly, the terminal device 300 may include the NFC reader 301, a controller 302, a storage 303, a display 304, and a communication module 305.

The NFC reader 301 reads out information of the NFC tag 201 through local area wireless communication between the electronic label 200 and the NFC tag 201. The local area wireless communication may be Near Field Communication (NFC). In addition, a functional configuration of the NFC reader 301 may be variable according to a functional configuration of the NFC tag 201 and/or a frequency band used by the NFC tag 201.

The controller 302 is configured to store, in the storage 303, information acquired from the NFC reader 301; transmit the acquired information to a management server 401 through the communication module 305; receive, from the management server, product information to be updated; and transmit the product information to be updated to the electronic label 200 through the NFC reader 301.

The controller 302 includes a processor and an executable memory, and may further include a bus and a specific electronic circuit (or an integrated circuit). The bus is used to input and output a specific program routine and/or program data with respect to a specific memory device in order to provide a unique function of the terminal device 300. In addition, the controller 302 is a general term of program routines and/or program data that are loaded from a specific memory device and/or a chipset to a memory and then computed by a processor to execute a unique function of the terminal device 300. Various functions of the terminal device 300 are executed, and the controller 302 may control and manage overall operations of the terminal device 300 in order to execute the various functions.

The storage 303 stores product information to be updated, which is received from the management server 401 that is described in the following. The display 304 displays various kinds of information for a manager. The display 304 may be a device that includes LCD, PDP, LED, CRT, and the like.

The communication module 305 is configured to communicate with the management server 401. The management server 401 is described in detail with reference to FIG. 4.

In addition, a configuration of the terminal device 300 shown in FIG. 3 is merely exemplary, and the terminal device 300 may include only some of the modules shown in FIG. 3 and/or further include other modules essential for operations as the same as those performed by the modules shown in FIG. 2. For example, the terminal device 300 may further include a barcode scanner to scan product information. That is, the terminal device 300 may read a barcode attached on or printed in a product, and may store the read result.

The terminal device 300 may be any portable device that executes various functions using wireless communication and any application program. For example, the terminal device 300 may be Personal Mobile Communication Services (PCS) terminals, Personal Digital Assistants (PDAs), smart phones, tablets, laptops, notebooks, wireless LAN terminal devices, and the like.

Figure 4:
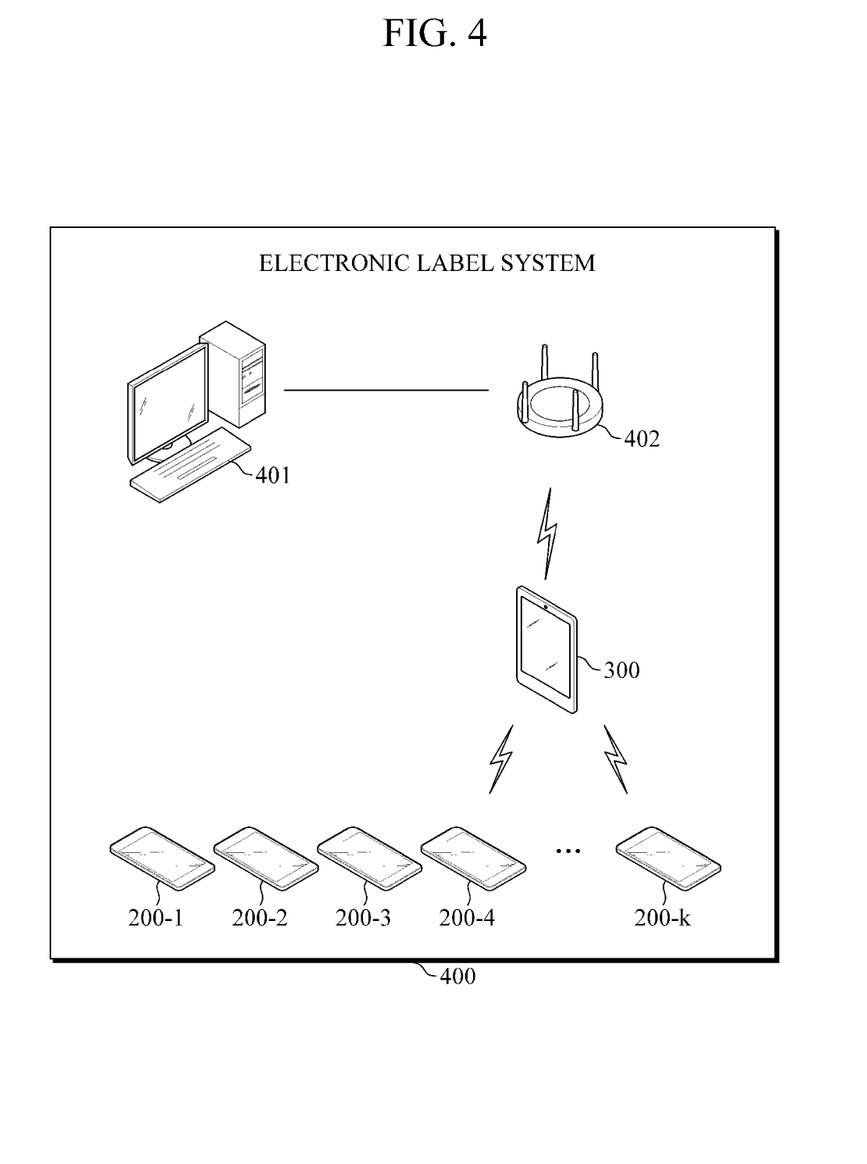
FIG. 4 is a diagram illustrating a configuration of an electronic label system according to another exemplary embodiment.

FIG. 4 is a diagram illustrating a configuration of an electronic label system according to another exemplary embodiment.

Referring to FIG. 4, an electronic label system 400 may include a management server 401, a gateway 402, an electronic label 200, and a terminal device 300.

The management server 401 stores and distributes data to manage products. Specifically, the management server 401 stores product information, e.g., price, of products displayed on store shelves, and, if the product information is changed and thus different information needs to be displayed, the management server 401 transmits data including the changed information. The management server 401 may include a database, which stores product information other management information for system operation, and a middleware which connects an external device and the database and relays data there between. In addition, the management server 401 may be connected with a Point of Sale (POS) system (not shown) to acquire sales information of products displayed on store shelves in real time.

The gateway 402 relays product information between the terminal device 300 and the management server 300. The management server 401 and the gateway 402 may be connected over a wired network or a wireless network, such as WiFi or Zigbee communication.

The terminal device 300 and the management server 401 transmit and receive information through the gateway 402, and the terminal device 300 and the electronic label 200 transmit and receive information through local area wireless communication. The local area wireless communication may be Near Field Communication (NFC).

According to one aspect of the present disclosure, the terminal device 300 may communicate with the management server 401 through WiFi communication. In this case, the gateway 402 may be a WiFi Access Point (AP).

Hereinafter, an information updating method of an electronic label according to an exemplary embodiment is described in detail.

Figure 5:
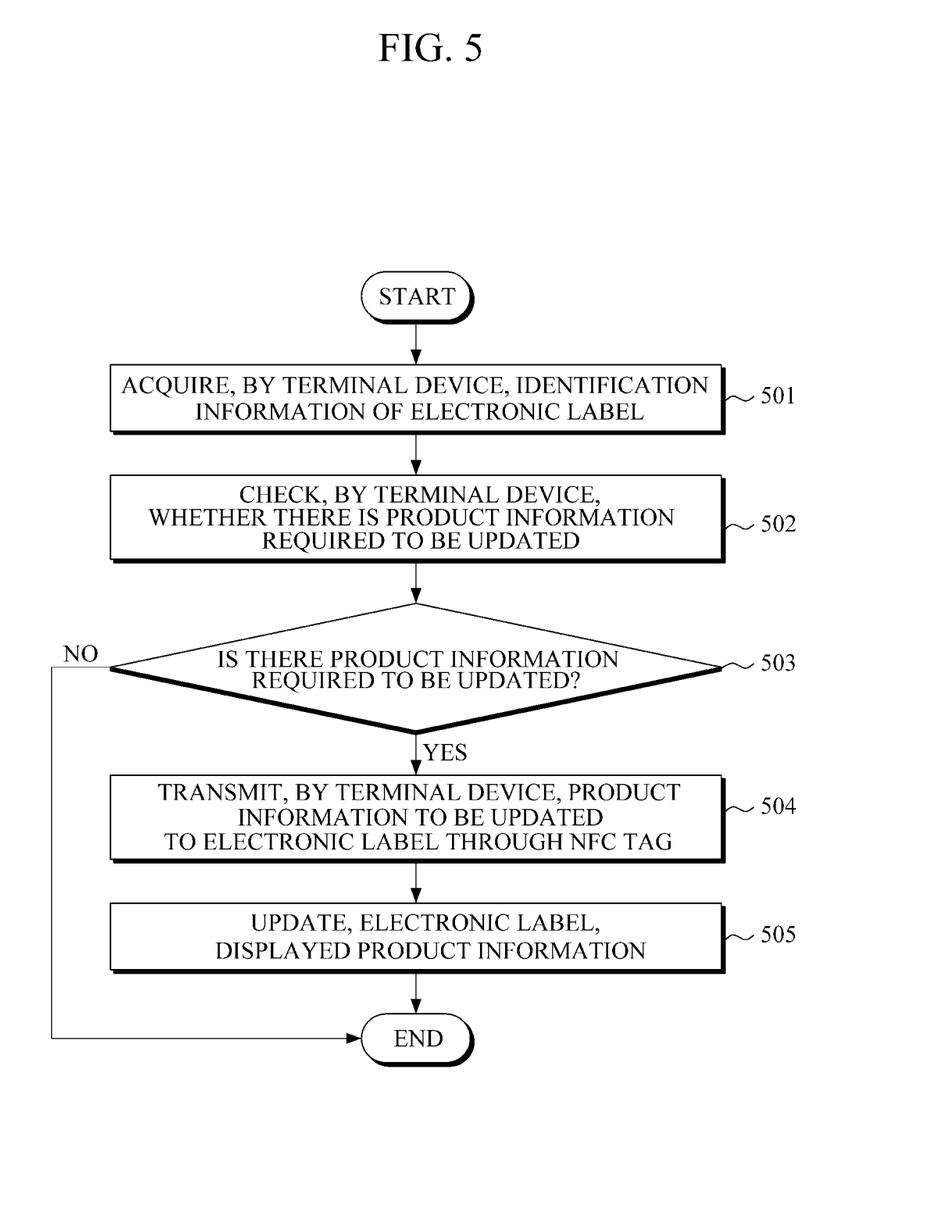
FIG. 5 is a flowchart illustrating an information updating method of an electronic label according to an exemplary embodiment.

FIG. 5 is a flowchart illustrating an information updating method of an electronic label according to an exemplary embodiment.

The process described in the following may be implemented in various ways. The method shown in FIG. 5 may be implemented in the electronic label system 400 shown in FIG. 4 by the electronic label 200 shown in FIG. 2 and the terminal device 300 shown in FIG. 3. Thus, to avoid redundancy, a product information updating method is described briefly, and the same descriptions provided above with reference to FIGS. 2, 3 and 4 may be applied hereto although they are not omitted in the following.

Referring to FIG. 5, an information updating method of the electronic label 200 includes operation 501 in which the terminal device 300 acquires identification information of the electronic label 200 through the NFC tag 201; operation 502 in which the terminal device 300 checks, based on the acquired identification information of the electronic label 200, whether there is product information required to be updated; operation 504 in which if it is found in operation 503 that there is product information required to be updated, the terminal device 300 transmits the product information to be updated to the electronic label 200 through the NFC tag 201; and operation 505 in which the electronic label 200 updates product information displayed on a display thereof.

In 501, the terminal device 300 acquires identification information of the electronic label 200 through the NFC tag 201. In this case, through local area wireless communication with the NFC tag 201, the NFC reader 301 of the terminal device 300 may read out unique identification information of the NFC tag 201, that is, the identification information of the electronic label 200. Specifically, if the terminal device 300 approaches close to the electronic label 200, the NFC tag 201 of the electronic label 200 is tagged by the terminal device 300.

In 502, based on the acquired identification information of the electronic label 200, the terminal device 300 checks whether there is product information required to be updated regarding the electronic label 200.

If it is found in 503 that there is product information required to be updated, the terminal device 300 transmits the product information to be updated to the electronic label 200 through the NFC tag 201 in 504.

Alternatively, if it is found in 503 that there is no product information required to be updated, the process is terminated.

In 505, the electronic label 200 updates product information displayed on a display thereof. In this case, once the electronic label 200 receives product information to be updated through the NFC tag 201, the processor 202 of the electronic label 200 is waken up from a sleep mode, stores the product information to be updated, and displays the stored product information.

Figure 6:
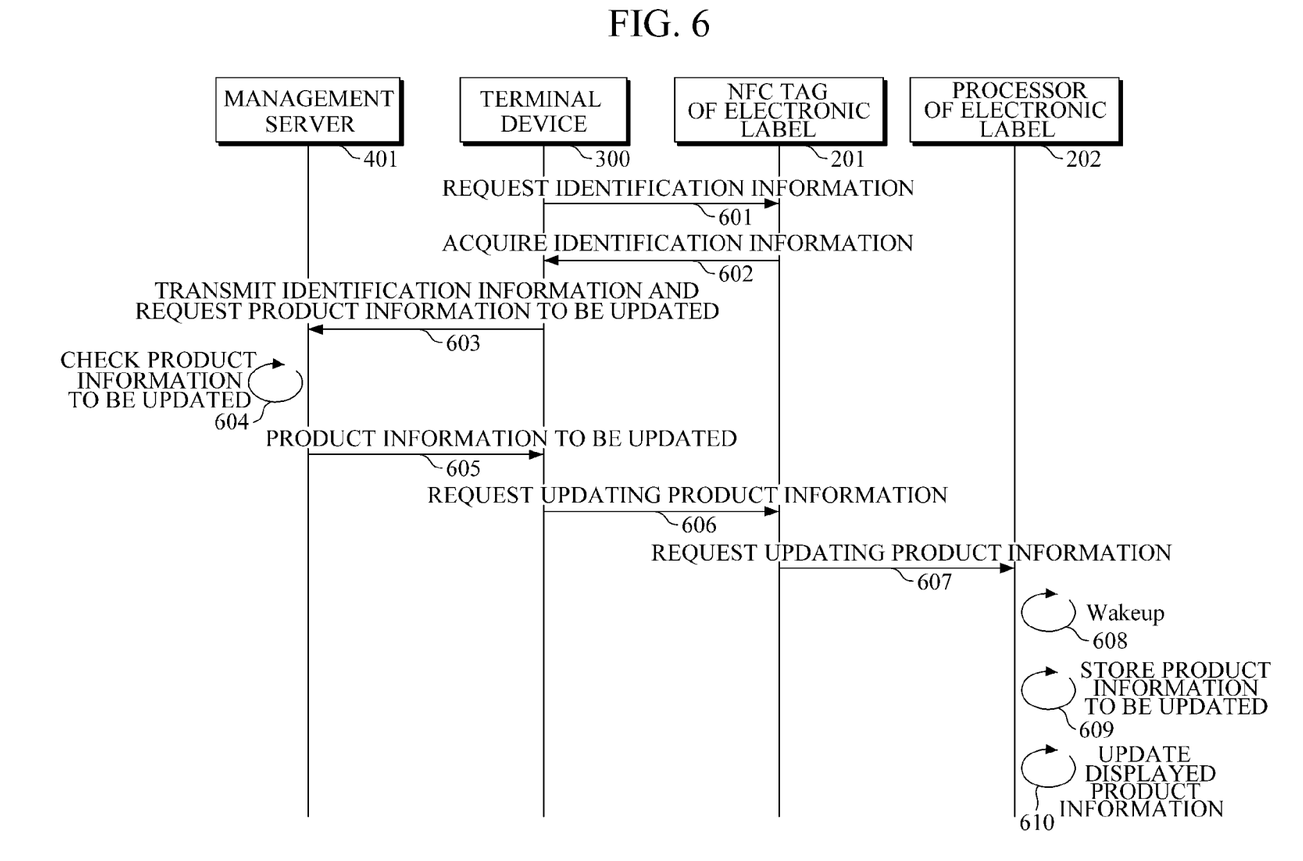
FIG. 6 is a flowchart illustrating an information updating method of an electronic label according to another exemplary embodiment.

FIG. 6 is a flowchart illustrating an information updating method of an electronic label according to another exemplary embodiment.

According to an exemplary embodiment, if the terminal device 300 transmits an updated information request message, including identification information of the electronic label 200, to the management server 401 in 502, the management server 401 may transmit product information to be updated, which corresponds to the updated information request message, to the terminal device 300 to check whether there is product information required to be updated.

Specifically, referring to FIG. 6, the terminal device 300 acquires the identification information of the electronic label 200 from the NFC tag 201 of the electronic label 200 in 601 and 602, and transmit the acquired identification information to the management server 401 to request product information to be updated in 603.

In 604, the management server 401 checks, based on the acquired identification information of the electronic label 200, whether there is product information required to be updated regarding the electronic label 200. If it is found that there is product information required to be updated, the management server 401 transmits the product information to be updated to the terminal device 300 in 605. The management server 401 may check an additional database or an external device to see if there is product information required to be updated.

Then, the terminal device 300 receives the product information to be updated from the management server 401 in 606 and transmits the product information to be updated to the electronic label 200 through the NFC tag 201 in 607. Then, the NFC tag 201 wakes up the processor 202 of the electronic label 200 from a sleep mode in 608, and the processor 202 controls the electronic label 200 to store the product information to be updated in 609 and to display the stored product information in 610.

Figure 7:
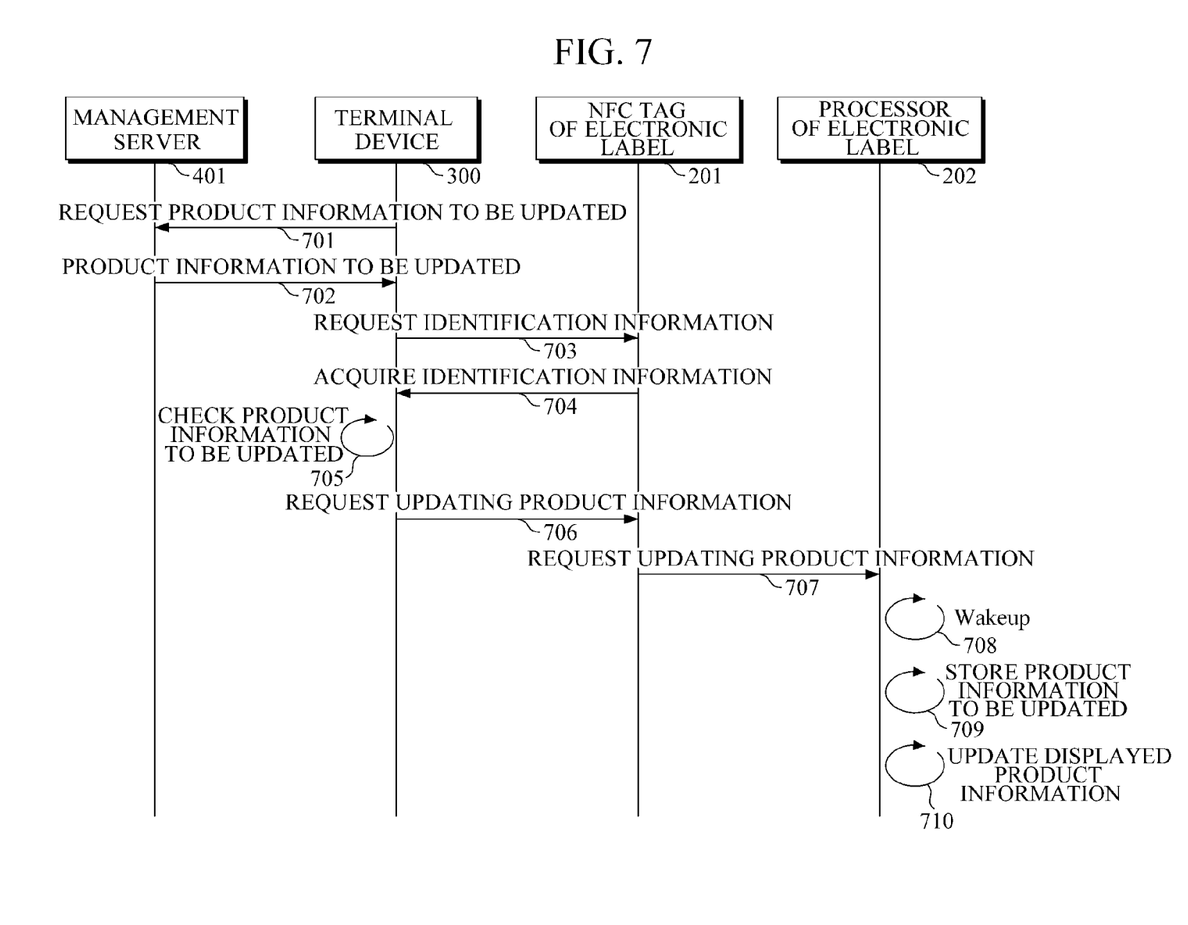
FIG. 7 is a flowchart illustrating an information updating method of an electronic label according to yet another exemplary embodiment.

FIG. 7 is a flowchart illustrating an information updating method of an electronic label according to yet another exemplary embodiment.

According to an exemplary embodiment, operation 502 is performed in the following process. That is, the terminal device 300 receives, from the management server 401, identification information of the electronic label 200 and updates target information that includes product information to be updated, which corresponds to the identification information of the electronic label 200. Based on the received update target information and the identification information of the electronic label 200, the terminal device 300 may check whether there is product information required to be updated.

Specifically, referring to FIG. 7, if the terminal device 300 requests product information to be updated from the management server 401 in 701, the management server 401 transmits update target information to the terminal device 300 in 702. In this case, the update target information may be data in a list form, which includes identification number of the electronic label 200 to be updated and product information to be updated.

Then, after the terminal device 300 acquires the identification information of the electronic label 200 from the NFC tag 201 of the electronic label 200 in 703 and 704, the terminal device 300 checks whether the electronic label 200 is a target for update based on the update target information received from the management server 401.

Then, in the case where the electronic label 200 is subject to update, the terminal device 300 transmits the product information to be updated, included in the update target information received from the management server 401, to the electronic label 200 through the NFC tag 201 in 706 and 707. After, the NFC tag 201 wakes up the processor 202 of the electronic label 200 from a sleep mode in 708, the processor 202 controls the electronic label 200 to store the product information to be updated in 709 and display the stored product information in 710.

According to an exemplary embodiment, once the electronic label 200 receives product information to be updated through the NFC tag 201, the processor 202 may be waken up from a sleep mode to store the product information to be updated and display the stored product information.

The NFC tag 201 has unique identification information, that is, an Electronic Product Code (EPC). In addition, the NFC tag 201 is configured to, in response to receiving, from the terminal device 300, the product information to be updated, wake up the processor 202 from a sleep mode.

NFC is one of RFID schemes and indicates a contactless local area wireless communication module that utilizes a frequency band of 13.56 MHz. Using NFC, terminals are able to transmit data to each other within a short range, such as 10 cm. Specifically, NFC allows two devices in communication with each other to transmit data using a magnetic field generated by loop antennas embedded therein. There are two modes: an active mode for communication between readers, and a passive mode for communication between a reader and a tag. Since a data reading function and a data writing function are all available, Dongles, which has been used for RFID, is not necessary anymore.

A NFC tag has unique identification information, that is, an EPC. In addition, an NFC reader is installed in a terminal device to be supplied with power, and reads out information of the NFC information through NFC with the NFC tag.

According to the aforementioned exemplary embodiments, it is possible to manage an electronic label system through a single communication network.

In addition, it is possible to update information on products displayed in a store that can be managed through a single communication network.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An electronic label system comprising:
   an electronic label comprising a display, a Near Field Communication (NFC) tag, a memory, and a processor configured to interface with the NFC tag; and
   a terminal device configured to:
      directly acquire identification information of the electronic label through the unique identification information of NFC tag if the terminal device approaches close to the electronic label;
      check whether there is product information required to be updated regarding the electronic label based on the acquired identification information of the electronic label; and
      directly transmit the product information required to be updated to the electronic label through the NFC tag, in response to detecting that the product information is required to be updated,
   wherein the NFC tag is passive NFC tag which is activated due to power supply from power components included in the wireless signal,
   wherein the NFC tag is further configured to wake up the processor from a sleep mode, in response to receiving the product information required to be updated, and to transmit the product information required to be updated, and
   wherein the processor is further configured to store the product information to be updated and to display the stored product information, in response to receiving the product information required to be updated.

2. The electronic label system of claim 1, further comprising:
   a management server configured to receive the acquired identification information from the terminal device, and to transmit, to the terminal device, product information required to be updated, wherein the product information required to be updated corresponds to the acquired identification information of the electronic label.

3. The electronic label system of claim 2, wherein the terminal device is further configured to communicate with the management server through WiFi communication.

4. An information updating method of an electronic label, comprising:
   acquiring, directly by a terminal device, identification information of the electronic label through unique identification information of a Near Field Communication (NFC) tag if the terminal device approaches close to the electronic label;
   checking, by the terminal device, whether there is product information required to be updated regarding the electronic label based on the acquired identification information of the electronic label;
   transmitting, directly by the terminal device, the product information required to be updated to the electronic label through the NFC tag, in response to detecting that the product information is required to be updated regarding the electronic label; and
   updating, by the electronic device, displayed product information,
   wherein the NFC tag is a passive NFC tag configured to be activated due to a power supply from power components included in a wireless signal, and
   wherein the updating of the displayed product information comprises waking up a processor from a sleep mode, in response to receiving through the NFC tag the product information to be updated, storing the product information to be updated, and displaying the stored product information.

5. The information updating method of claim 4, wherein the checking of whether there is product information required to be updated regarding the electronic label comprises:
   receiving, by the management server, from the terminal device, an updated information request message comprising the acquired identification information of the electronic label; and
   transmitting, by the management server, to the terminal device, product information required to be updated, wherein the product information required to be updated corresponds to the received updated information request message to check whether there is product information required to be updated.

6. The information updating method of claim 4, wherein the checking of whether there is product information to be updated regarding the electronic label comprises:
   receiving, by the terminal device, from the management server, target update information, wherein the target update information comprises the acquired identification information of the electronic label and product information to be updated, and wherein the product information to be updated corresponds to the acquired identification information of the electronic label; and
   checking, by the management server, whether there is product information required to be updated regarding the electronic label based on the target update information and the acquired identification information of the electronic label.

* * * * *